United States Patent [19]

Martens

[11] 4,032,448
[45] June 28, 1977

[54] SEALED SEWAGE EJECTOR ASSEMBLY

[75] Inventor: David Martens, Winnipeg, Canada

[73] Assignee: D. Marten's Manufacturing Company Ltd., Winnipeg, Canada

[22] Filed: Dec. 22, 1975

[21] Appl. No.: 646,441

Related U.S. Application Data

[63] Continuation-in-part of Ser. No. 522,050, Nov. 8, 1974, abandoned.

[52] U.S. Cl. .......................... 210/170; 210/198 R; 210/532 S
[51] Int. Cl.² ......................................... B01D 21/24
[58] Field of Search ...... 210/152, 170, 193, 198 R, 210/532 S; 261/DIG. 75; 417/76, 80, 89, 151, 174

[56] References Cited

UNITED STATES PATENTS

| | | | |
|---|---|---|---|
| 2,077,024 | 4/1937 | Tanner et al. | 417/151 |
| 2,472,459 | 6/1949 | Banks | 210/193 X |
| 2,889,047 | 6/1959 | Coate | 210/532 S X |
| 3,078,809 | 2/1963 | Wakefield | 417/151 X |
| 3,514,220 | 5/1970 | Hahn, Jr. | 417/151 |
| 3,558,240 | 1/1971 | Snodgrass | 417/174 |
| 3,724,664 | 4/1973 | Lemberger et al. | 210/170 X |

Primary Examiner—Thomas G. Wyse
Assistant Examiner—Robert H. Spitzer
Attorney, Agent, or Firm—Stanley G. Ade

[57] ABSTRACT

Conventional sewage ejector systems include a standpipe into which effluent may drain and seep into the surrounding soil thus causing pollution problems. This device includes a sewage ejector nozzle connected to a discharge pipe and forming part of said pipe. The nozzle and pipe are detachably secured within a sealed standpipe so that when the system is not working, the effluent within the discharge pipe drains back into the standpipe and is contained thereby until the next discharge cycle commences at which time it is picked up by the effluent passing through the jet which includes a venturi restriction. When the effluent in the standpipe is all ejected, air is picked up and entrained in the effluent stream thus aerating the discharge effluent.

12 Claims, 5 Drawing Figures

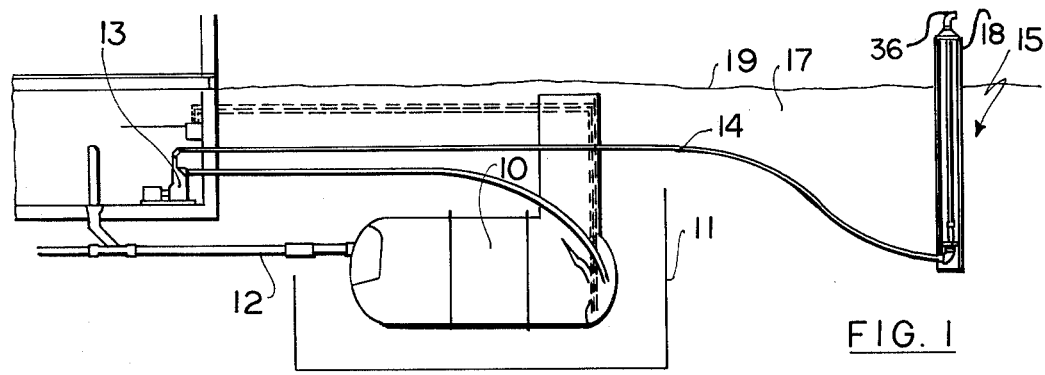
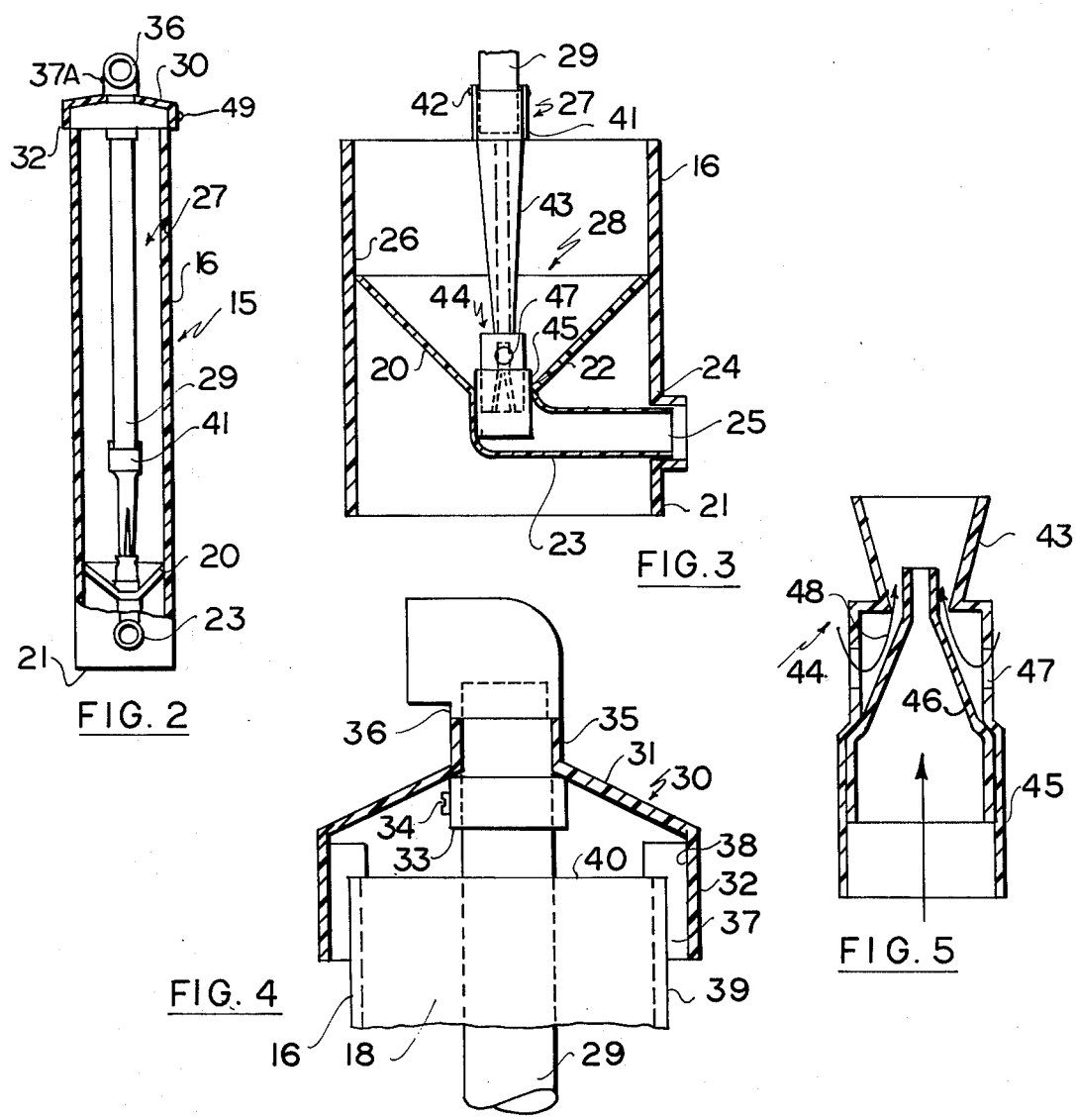

SEALED SEWAGE EJECTOR ASSEMBLY

BACKGROUND OF THE INVENTION

This application is a continuation-in-part of application, Ser. No. 522,050, filed Nov. 8, 1974, now abandoned.

Conventional sewage discharge systems from spetic tanks and the like often drain into the sub-surface soil, particularly when the cycle stops as the discharge pipe preferably drains at this point in order to prevent freeze-up occurring cold weather. In areas of high water tables and previous soils, there is always the possibility of pollution occurring to the water supply so that care has to be taken in installation of such systems.

SUMMARY OF THE INVENTION

The present invention overcomes the disadvantages normally inherent with existing sewage ejector systems, but at the same time retains the desirability of frost-free performance in cold weather areas.

The assembly incorporates a totally enclosed ejector assembly having an outer riser pipe with a cone-shaped base. The cone-shaped base is connected to the plastic discharge pipe from the sewage pump. A venturi assembly forming part of a discharge pipe, sits into the seat of the cone-shaped base and a small diameter pipe extends upwardly forming the remainder of the discharge pipe. When the pump stops, the small diameter discharge pipe drains back into the sealed outer riser pipe or standpipe and on the next pumping cycle, the venturi assembly drains the outer riser pipe or standpipe thus providing frost-free surface discharge of all effluent without any sub-surface seepage.

The principal object and essence of the invention is therefore to provide a device of the character herewithin described in which the venturi jet discharge assembly is sealably connected within a standpipe so that no seepage can occur from the standpipe to the sub-soil.

Another object of the invention is to provide a device of the character herewithin described which has provision for draining the discharge pipe when the pump is not operating thus preventing the discharge pipe from freezing up in cold weather.

Another object of the invention in conjunction with the foregoing object, is to provide means whereby sewage drained into a standpipe, is picked up on the next cycle and discharged through the discharge pipe.

Still another object of the invention in conjunction with the foregoing objects, is to provide means whereby once the standpipe has been drained, air is picked up by the jet assembly and entrained in the discharging sewage effluent thus aerating same and improving the distribution and dissemination of the discharging effluent.

A further object of the invention is to provide a device in which the ejection nozzle assembly can easily be removed and replaced from the surface of the ground.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 1 is a schematic view of a sewage system with the invention installed therein.

FIG. 2 is a side elevation of the invention with the standpipe sectioned for clarity.

FIG. 3 is an enlarged partially sectioned cross sectional view of the lower end of the device.

FIG. 4 is a view similar to FIG. 3, but showing the upper end of the device.

FIG. 5 is an enlarged cross sectional view of the venturi assembly per se.

In the drawings like characters of reference indicate corresponding parts in the different figures.

DETAILED DESCRIPTION

The advantage of sewage ejectors for surface sewage disposal on farms and the like in the Prairie Provinces particularly, has been accepted for several years and the sewage jet appears to be steadily growing in popularity, because the system had reduced pollution problems and provided a more trouble free and economical system.

Such systems require that they be manufactured from corrosive resistant material as sewage can be very corrosive, and furthermore they should be easily serviced, particularly in cold weather.

It is also desirable that the system includes a completely sealed effluent holding area or standpipe because in regions with a high water table, it is important that all of the sewage effluent be pumped onto the ground surface in order to reduce ground water pollution. Exposing the effluent to the air, sunshine and other elements on the ground surface, greatly increases the speed of purification of effluent, and by disposing of all of the effluent on the ground surface, the effluent must penetrate the maximum depth of overburden before ground pollution can occur.

Proceeding therefore to describe the invention in detail, reference to the accompanying drawings which show that a conventional sewage installation is shown in FIG. 1, having a septic tank 10 usually buried within a pit 11 and receiving sewage via pipe or conduit 12. After clarification, and when the level within the tank has reached a pre-determined point, a pump 13 pumps out the tank and discharges the effluent through a buried conduit 14 which is connected to a sewage ejector assembly collectively designated 15 and which forms the invention.

The assembly includes a cylindrical standpipe or riser pipe 16 situated vertically within the ground 17 and having the upper end 18 above ground level 19.

This standpipe is provided with a hollow, inverted truncated cone-shaped base 20 acting as a fluid collecting component and cemented within the standpipe just above the lower end 21 thereof, said cone-shaped base having a central aperture 22 formed at the lower end thereof. A plastic elbow 23 is cemented to this base and to an aperture formed within the wall 24 of the standpipe as clearly shown in FIG. 3 and the aforementioned flexible conduit 14 is screwthreadably secured to the portion 25 of the elbow as clearly illustrated.

The aforementioned cone-shaped base 20 is also preferably manufactured from plastic and is sealed to the inner surface 26 of the standpipe 16 thus sealing the base of the standpipe.

A discharge pipe assembly collectively designated 27 is located concentrically within the standpipe 16 and includes a sewage ejector nozzle assembly collectively designated 28, connected to the lower end of a length of pipe or conduit 29, said pipe or conduit 29 extending upwardly and having a cap 30 detachably secured to the upper end thereof. This cap 30 is provided with a sloping wall 31 centrally apertured to slip over the upper end of the portion 29 of discharge pipe assembly and a peripheral wall 32 depends downwardly from the periphery of the sloping wall 31 as clearly shown. The cap 30 is prevented from further downward movement relative to the pipe 29 by means of a collar 33 secured around the pipe by means of set screws 34 or the like and upon which the sloping wall portion of the cap rests as shown in FIG. 4 An upwardly extending collar 35 surrounds the portion of the pipe 29 extending through the cap and a substantially 90° discharge elbow 36 engages the outer end and is secured thereto by means of a set screw 37A or the like, so that the effluent is discharged substantially horizontal to the ground surface.

Means are provided to permit communication between the atmosphere and the interior of the standpipe via the cap 30 and in this connection a plurality of shouldered ridges 37 are formed on the inner wall 38 of the annular collar portion 32 thus maintaining this inner wall 38 spaced from the outer surface or wall 39 of the standpipe thus allowing an air passageway connection therethrough. In this connection, the upper ends of these portions 37 extend inwardly and rest upon the upper extremity 40 of the standpipe thus locating the cap assembly 30 relative to the standpipe 16.

The ejector nozzle assembly 28 includes a conduit attachment upper end 41 which sits over the lower end of the conduit 29 and is secured thereto by means of set screws 42 or other convenient securing means.

A slightly tapering cylindrical section 43 extends from the upper end 41 downwardly to the jet assembly collectively designated 44 and this jet assembly is shown in detail in FIG. 5. An enlarged cylindrical portion 45 is formed on the lower end of the portion 43 and the lower end of this cylindrical portion 45 is frictionally engaged within the aperture in the base of the cone-shaped portion 20 as shown in FIG. 3.

This construction allows the assembly and the standpipe to be rotated manually through 360° so that the direction of discharge of the effluent can be varied as desired.

A nozzle 46 is secured within the cylindrical portion 45 extends upwardly into the lower end of the tapered portion 43. This nozzle narrows in diameter and terminates spaced from the wall of the lower end of the portion 43 as clearly shown in FIG. 5 and the portion of the cylindrical enlargement 45 adjacent the tapered walls of the nozzle 46, is provided with at least one aperture 47 therethrough.

In operation, sewage effluent is pumped from the septic tank 10 through conduit 14 and into the elbow 23. It then passes upwardly through the nozzle assembly 44 into the discharge conduit portion 29 and thence to the discharge elbow 36 where it is ejected above ground level.

When the pump shuts down, any effluent within the discharge pipe drains downwardly through apertures 47 into the standpipe so that it is well below frost level.

When the next cycle occurs, the effluent passing through the nozzle 46 causes a venturi action in the area 48 surrounding the upper end of the nozzle 46 which picks up any effluent within the base of the standpipe and ejects with the effluent passing through the discharge pipe. When the standpipe has been drained, air is drawn in between the cap 30 and the upper end of the standpipe 16 and is entrained within the sewage effluent being discharged through the discharge pipe assembly 27. This aerates the sewage and assists in the evaporation and dispersal thereof through the discharge elbow 36.

The cap 30 is detachably secured to the upper end of the standpipe 16 by means of set screws 49 and if it is desired to obtain access to the assembly, it is merely necessary to loosen the set screws whereupon the entire discharge assembly together with the cap 30 may be withdrawn from the cone-shaped base 20. Replacement is the reverse of this assembly and the repair and maintenance of the device is therefore facilitated, it being understood that any problems normally occur within the jet assembly 28 rather than in the conduit 14 and base 30 of the device. In this connection, the jet assembly is guided into position by the sloping walls of the component 20, it being understood that this component may be situated ten to twelve feet below ground level.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A sewage effluent ejector assembly connected to a sewage system which includes a septic tank, a pump operatively connected to said septic tank and a conduit extending from said pump to said assembly; said assembly comprising in combination a standpipe, the upper end of said standpipe being above ground when installed, means sealably connecting the associated conduit to adjacent the lower end of said standpipe, said means including a fluid collecting component sealably secured within said standpipe adjacent the lower end thereof, said fluid collecting component comprising a collector member in the form of a hollow, truncated inverted cone, having an aperture therein and having means sealably connecting the associated conduit to said component and communicating with the interior thereof, a discharge pipe located substantially concentrically within said standpipe, and a sewage ejector nozzle assembly on the lower end of said discharge pipe, said sewage ejector nozzle assembly including an intake lower end, a venturi component and a discharge upper end, said intake lower end being situated within said aperture of said collector member of said fluid collector component and detachably and sealably communicating with said means sealably connecting the associated conduit to said fluid collecting component, the upper end of said discharge pipe extending through the upper end of said standpipe whereby said sewage discharge pipe and said sewage ejection nozzle assembly can be engaged and disengaged from said fluid collecting component, and air entry means communicating between atmosphere and the interior of said standpipe.

2. The device accoding to claim 1 in which said inverted hollow truncated cone is secured by the outer perimeter thereof to said standpipe in sealing relationship therewith, the truncated lower end including an elbow connecting to said associated conduit, said intake lower end of said sewage ejection nozzle assembly frictionally and sealablyengaging within said truncated lower end and being guided into position by said hollow cone formation of said fluid collecting component.

3. The device accordng to claim 2 in which said discharge pipe includes a discharge elbow on the upper end thereof, said pipe said elbow and said sewage ejection nozzle assembly being manually rotatable through 360° within said fluid collecting component whereby said discharge elbow can be directed in any direction radially of said discharge pipe.

4. The device according to claim 3 which includes cap means surrounding said discharge pipe and being detachably secured to the upper end of said standpipe.

5. The device according to claim 4 in which said cap means includes said air entry means communicating between atmosphere and the interior of said standpipe, said last mentioned means including a standpipe upper end engaging rim on said cap surrounding the outside wall of said upper end of said standpipe, means to detachably secure said rim to said wall and means to maintain the inner surface of said rim spaced from the outer surface of said wall for at least a portion of the periphery of said wall thereby forming said air entry means.

6. The device according to claim 2 which includes cap means surrounding said discharge pipe and being detachably secured to the upper end of said standpipe.

7. The device accordng to claim 3 which includes cap means said cap means including said air entry means communicating between atmosphere and the interio of said standpipe, said last mentioned means including a standpipe upper end engaging rim on said cap surrounding the outside wall of said upper end of said standpipe, means to detachably secure said rim to said wall and means to maintain the inner surface of said rim spaced from the outer surface of said wall for at least a portion of the periphery of said wall thereby forming said air entry means.

8. The device according to claim 6 in which said cap means includes said air entry means communicating between atmosphere and the interior of said standpipe, said last mentioned means including a standpipe upper end engaging rim on said cap surrounding the outside wall of said upper end of said standpipe, means to detachably secure said rim to said wall and means to maintain the inner surface to said rim spaced from the outer surface of said wall for at least a portion of the periphery of said wall thereby forming said air entry means.

9. The device according to claim 2 which includes cap means said cap means including said air entry means communicating between atmosphere and the interior of said standpipe, said last mentioned means including a standpipe upper end engaging rim on said cap surrounding the outside wall of said upper end of said standpipe, means to detachably secure said rim to said wall and means to maintain the inner surface of said rim spaced from the outer surface of said wall for at least a portion of the periphery of said wall thereby forming said air entry means.

10. The device according to claim 1 which includes cap means surrounding said discharge pipe and being detachably secured to the upper end of said standpipe.

11. The device according to claim 10 in which said cap means includes said air entry means communicating between atmosphere and the interior of said standpipe, said last mentioned means including a standpipe upper end engaging rim on said cap surrounding the outside wall of said upper end of said standpipe, means to detachably secure said rim to said and means to maintain the inner surface of said rim spaced from the outer surface of said wall for at least a portion of the periphery of said wall thereby forming said air entry means.

12. A sewage effluent ejector assembly connected to a sewage system which includes a septic tank, a pump operatively connected to said septic tank and a conduit extending from said pump to said assembly; said assembly comprising in combination a standpipe, the upper end of said standpipe being above ground when installed, means sealably connecting the associated conduit to adjacent the lower end of said standpipe, said means including a fluid collecting component sealably secured within said standpipe adjacent the lower end thereof, said fluid collecting component having means sealably connecting the associated conduit to said component and communicating with the interior thereof, a discharge pipe located substantially concentrically within said standpipe, and a sewage ejector nozzle assembly on the lower end of said discharge pipe, said sewage ejector nozzle assembly including an intake lower end, a venturi component and a discharge upper end, said intake lower end being situated within said fluid collector component and detachably and sealably communicating with said means sealably connecting the associated conduit to said fluid collecting component, the upper end of said discharge pipe extending through the upper end of said standpipe whereby said sewage discharge pipe and said sewage ejection nozzle assembly can be engaged and disengaged from said fluid collecting component, and air entry means communicating between atmosphere and the interior of said standpipe, said assembly further comprising cap means including said air entry means communicating betwee atmosphere and the interior of said standpipe, said last mentioned means including a standpipe upper end engaging rim on said cap surrounding the outside wall of said upper end of said standpipe, means for detachably securing said rim to said wall and means for maintaining the inner surface of said rims spaced from the outer surface of said wall for at least a portion of the periphery of said wall thereby forming said air entry means.

* * * * *